United States Patent
Deagon

(10) Patent No.: US 8,925,052 B2
(45) Date of Patent: Dec. 30, 2014

(54) APPLICATION INTEGRATION

(75) Inventor: Arthur Deagon, Hoover, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1917 days.

(21) Appl. No.: 11/733,310

(22) Filed: Apr. 10, 2007

(65) Prior Publication Data

US 2008/0189777 A1  Aug. 7, 2008

Related U.S. Application Data

(60) Provisional application No. 60/820,412, filed on Jul. 26, 2006.

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| G06F 21/41 | (2013.01) |

(52) U.S. Cl.
CPC ............ *H04L 63/0815* (2013.01); *G06F 21/41* (2013.01); *H04L 29/06768* (2013.01)
USPC .......... 726/6; 726/4; 726/8; 726/27; 713/185; 709/227; 709/228

(58) Field of Classification Search
CPC ..................... H04L 63/0815; H04L 29/06768; G06F 21/41
USPC .............. 726/4–8, 27; 713/185; 709/227–228
See application file for complete search history.

(56) References Cited

U.S. PATENT DOCUMENTS

| | | | | |
|---|---|---|---|---|
| 6,128,738 | A * | 10/2000 | Doyle et al. .................. | 713/185 |
| 6,327,659 | B2 * | 12/2001 | Boroditsky et al. ........... | 713/182 |
| 6,892,307 | B1 * | 5/2005 | Wood et al. ....................... | 726/8 |
| 6,954,799 | B2 * | 10/2005 | Lerner .......................... | 709/240 |
| 7,016,875 | B1 * | 3/2006 | Steele et al. ..................... | 705/44 |
| 7,426,642 | B2 * | 9/2008 | Aupperle et al. .............. | 713/185 |
| 7,475,146 | B2 * | 1/2009 | Bazot et al. ................... | 709/227 |
| 7,480,718 | B2 * | 1/2009 | Marcus et al. ................ | 709/225 |
| 7,496,954 | B1 * | 2/2009 | Himawan et al. .................. | 726/8 |
| 7,509,672 | B1 * | 3/2009 | Horwitz et al. .................... | 726/8 |
| 7,568,182 | B2 * | 7/2009 | Villaron et al. ............... | 717/121 |
| 7,657,639 | B2 * | 2/2010 | Hinton .......................... | 709/229 |
| 7,669,199 | B2 * | 2/2010 | Cope et al. .................... | 717/174 |

(Continued)

OTHER PUBLICATIONS

Raj Balasubramanian, Stan Logan; "SSO-Enabling Sametime with Netegrity Siteminder"; Mar. 3, 2003; Lotus Software, IBM, Software Group. pp. 1-3.*

(Continued)

*Primary Examiner* — Jeffrey Pwu
*Assistant Examiner* — Jayesh Jhaveri
(74) *Attorney, Agent, or Firm* — Hartman & Citrin LLC

(57) ABSTRACT

One embodiment of a method of integrating software applications includes customizing properties of an InfoVista application to accept a format of login strings provided by a SiteMinder application; modifying authentication information in properties of the InfoVista application to match authentication information that is to be sent from the SiteMinder application; and customizing the SiteMinder application to pass authentication information needed by the InfoVista application for login of a user into the InfoVista application using a single sign-on interface provided by the SiteMinder application. Other methods and systems are also provided.

15 Claims, 9 Drawing Sheets

(56) References Cited

U.S. PATENT DOCUMENTS

| | | | |
|---|---|---|---|
| 7,698,734 B2* | 4/2010 | Kupherstein et al. | 726/8 |
| 8,185,938 B2* | 5/2012 | Benantar | 726/8 |
| 2002/0194076 A1* | 12/2002 | Williams et al. | 705/26 |
| 2003/0070069 A1* | 4/2003 | Belapurkar et al. | 713/155 |
| 2003/0226036 A1* | 12/2003 | Bivens et al. | 713/201 |
| 2004/0098595 A1* | 5/2004 | Aupperle et al. | 713/185 |
| 2004/0193921 A1* | 9/2004 | Byrne | 713/201 |
| 2005/0075910 A1* | 4/2005 | Solankl et al. | 705/4 |
| 2005/0235050 A1* | 10/2005 | Baker | 709/220 |
| 2006/0031494 A1* | 2/2006 | Marcus et al. | 709/225 |
| 2006/0048216 A1* | 3/2006 | Hinton et al. | 726/8 |
| 2006/0075224 A1* | 4/2006 | Tao | 713/164 |
| 2006/0265740 A1* | 11/2006 | Clark et al. | 726/8 |
| 2006/0271689 A1* | 11/2006 | Kikuchi | 709/227 |
| 2008/0168560 A1* | 7/2008 | Durie et al. | 726/23 |

OTHER PUBLICATIONS

InfoVista™ VistaPortal 2.1, Administrator's Guide, Copyright 1996-2005 by InfoVista SA, pp. 1-420.

Netegrity SiteMinder® Web Agent Installation Guide, 5.x QMR 5, Netegrity, Securely let business in Keep Risk Out, dated Jul. 2003, pp. 1-126.

* cited by examiner

```
# Credential 6

# If you want to use http basic authentication (Authentication in browser),
# do not modify and remove this service.
credential.service.6=com.InfoVista.net.security.HttpHeaderCredential
credential.login.key.6=login
credential.login.syntax.6=%login%
credential.password.key.6=password
credential.password.syntax.6=%password%
```

FIG. 6

APPLICATION INTEGRATION

CROSS-REFERENCE TO RELATED APPLICATION

This application claims priority to U.S. provisional application entitled, "Authentication Integration," having Ser. No. 60/820,412, filed Jul. 26, 2006, now expired, which is entirely incorporated herein by reference.

TECHNICAL FIELD

The present disclosure is generally related to software integration.

BACKGROUND

InfoVista® is a leader in Service-Centric Performance Management software and assures the optimal delivery of business-critical information technology (IT) services. InfoVista applications can be integrated with other management systems to leverage existing tools and processes, in order to resolve network service level issues.

SiteMinder® is another software application, and it enables operators and administrators to assign authentication schemes, define and manage authorization privileges to specific resources, and create rules and policies to implement these authorization permissions. With the SiteMinder application, companies can implement security policies to completely protect the content for an entire Web site. Integration of the SiteMinder application with the InfoVista application has proved troublesome.

SUMMARY

Embodiments of the present disclosure provide systems and methods of integrating software applications. One embodiment of such a method includes customizing properties of an InfoVista® application to accept a format of login strings provided by a SiteMinder® application; modifying authentication information in properties of the InfoVista application to match authentication information that is to be sent from the SiteMinder application; and customizing the SiteMinder application to pass authentication information needed by the InfoVista application for login of a user into the InfoVista application using a single sign-on interface provided by the SiteMinder application.

Briefly described, one embodiment of a system of integrating software applications includes a first component configured to customize properties of an InfoVista application to accept format of login strings provided by a SiteMinder application. The system further includes a second component configured to modify authentication information of properties of the InfoVista application to match authentication information that is to be sent from the SiteMinder application and a third component configured to customize the SiteMinder application to pass authentication information needed by the InfoVista application for login of a user into the InfoVista application using a single sign-on interface provided by the SiteMinder application.

Other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 is a diagram of a properties file of the InfoVista application matching the settings shown in FIG. 5.

DETAILED DESCRIPTION

Figure 1:
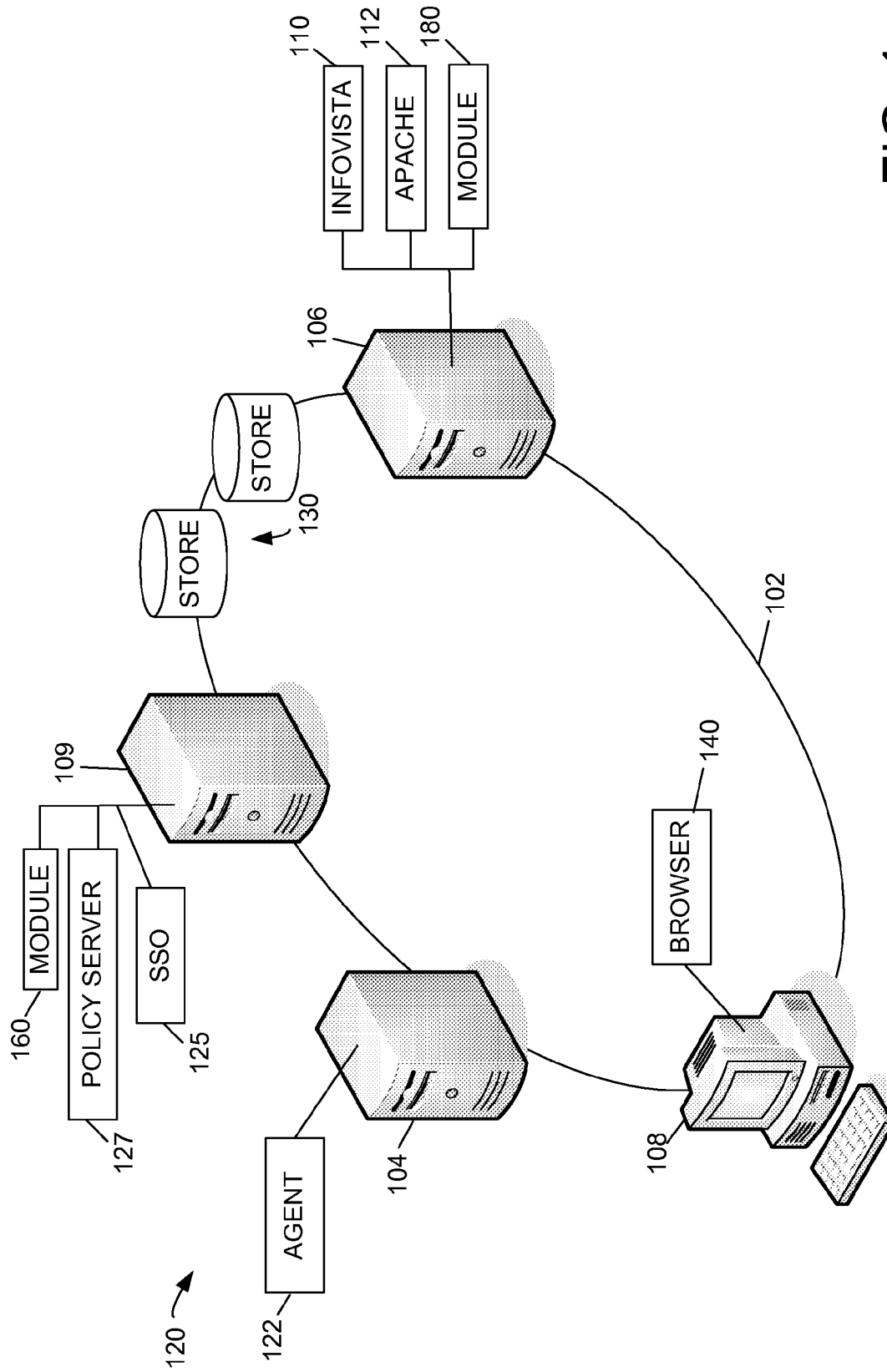
FIG. 1 is a block diagram of one embodiment of network infrastructure in accordance with the present disclosure.

InfoVista®, distributed by INFOVISTA corporation of Les Ulis, France, is a leader in Service-Centric Performance Management software and assures the optimal delivery of business-critical information technology (IT) services. As an application, InfoVista collects statistics on network devices like routers and switches, and it stores that information in a database which allows a user to view past or historical information, get trending and performance information on the network devices, etc. It may be regarded as a capacity performance management tool for network gear. It also may be used for service level agreement type of uses. For instance, different kinds of information may be collected to prove that a department is providing the customer the proper agreement standard. Generally, the InfoVista application enables IT managers to detect, isolate and resolve network service level problems with its views of the performance of connections and components throughout the entire network infrastructure.

In one embodiment, among others, network infrastructure comprises an enterprise network 102 having a Web server 104. Web server 104 hosts an agent application 122 for the SiteMinder® suite of applications, distributed by CA Corporation of Islandia, N.Y. The suite of applications may be bundled together as a package and capable of interacting with each other. For example, a server 109 may host additional SiteMinder applications, such as a single sign-on tool 125 and a policy server application 127. The policy server 127 may access databases or user stores 130. An InfoVista application 110 is also hosted by a server 106. A user at a client 108 having a web browser 140 may access applications hosted by servers on the network 102.

InfoVista 110 (FIG. 1) can be integrated with other management systems to leverage existing tools and processes, in order to resolve network service level issues. The flexibility, scalability and openness of InfoVista products provide an efficient environment to give any IT decision maker the necessary visibility to leverage IT infrastructure to competitive advantage. A corporation may use InfoVista 110 for capacity and performance management of the network elements.

SiteMinder application 120 (FIG. 1) is another software application and it enables operators and administrators to assign authentication schemes, define and manage authorization privileges to specific resources, and create rules and policies to implement these authorization permissions.

With SiteMinder, companies can implement security policies to completely protect the content for an entire web site.

SiteMinder single sign-on (SSO) 125 is an authentication tool, as part of the suite of SiteMinder components, that may be integrated within other tools to have a single point of authentication within a corporation. For example, SiteMinder application 120 can implement a rule of how long a password can remain in effect before it has to be changed, rules regarding passwords, such as a password having to contain a capital letter, a special character, be so many digits long, etc. In some versions, SiteMinder application 120 provides web access management solutions. Web access management solutions are employed by organizations to manage and enforce authentication, authorization, and single sign-on for web resources such as JSP (Java Server Page) files, ASP (Active Server Page) files, or HTML (hypertext markup language) files.

Figure 2:
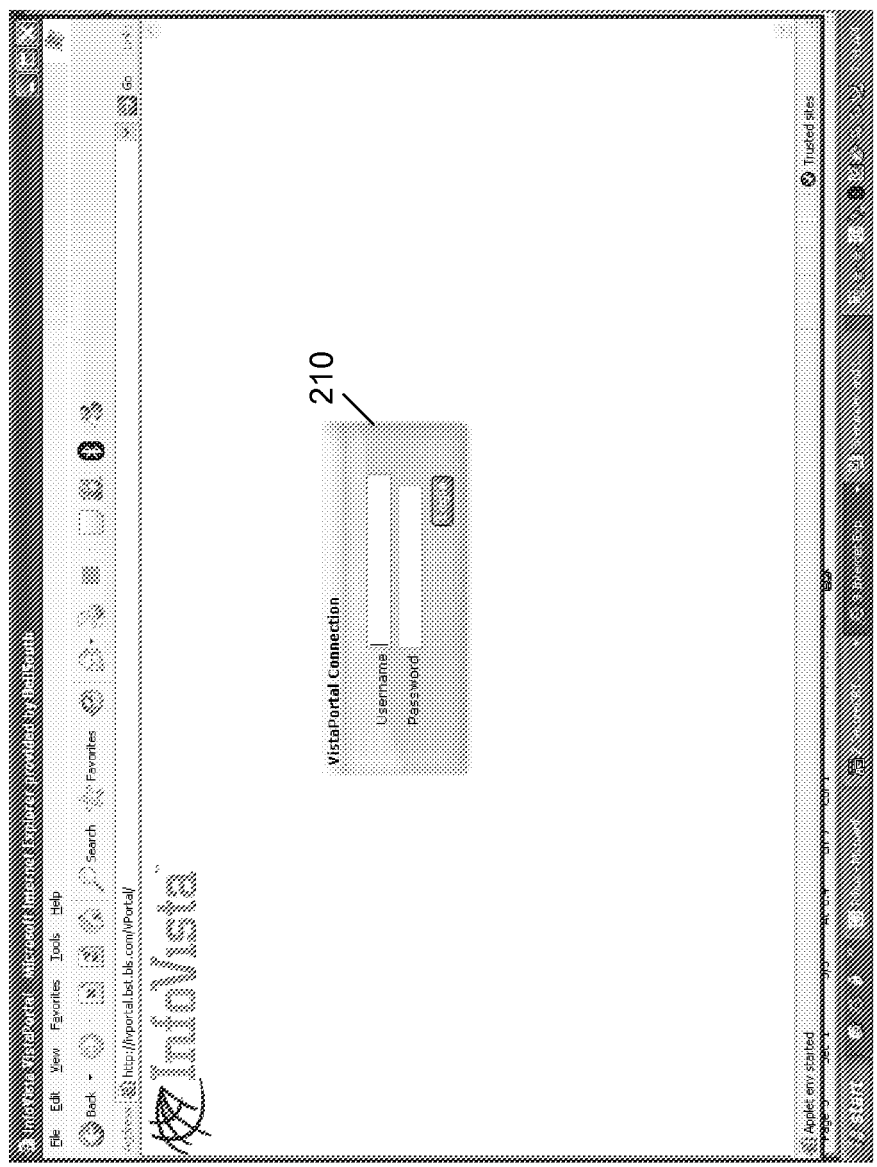
FIG. 2 is a screenshot of an exemplary sign-on interface for an InfoVista application® from the infrastructure of FIG. 1.

For comparison purposes, FIG. 2 shows a sign-on interface 210 the InfoVista application 110 uses to authenticate the user, if SiteMinder single sign-on 125 is not integrated with InfoVista 110. When using the InfoVista application sign-on interface 210, password management and maintenance is maintained by InfoVista application support. A corporation's security standards may not then be met by the InfoVista authentication standards which can make the InfoVista application 110 more vulnerable to unauthorized access.

Figure 3:
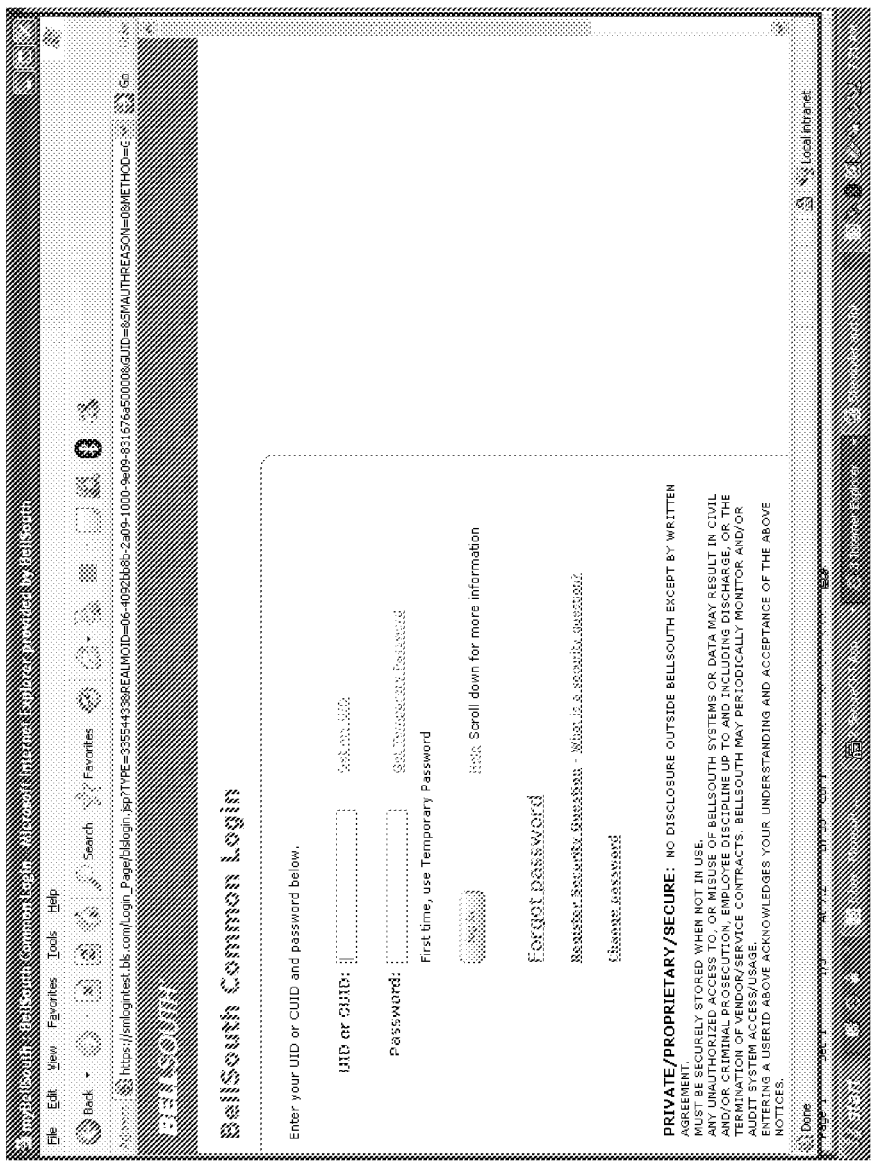
FIG. 3 is a screenshot of an exemplary single sign-on interface for a SiteMinder® application from the infrastructure of FIG. 1 when a user attempts to access the InfoVista application.
Figure 4:
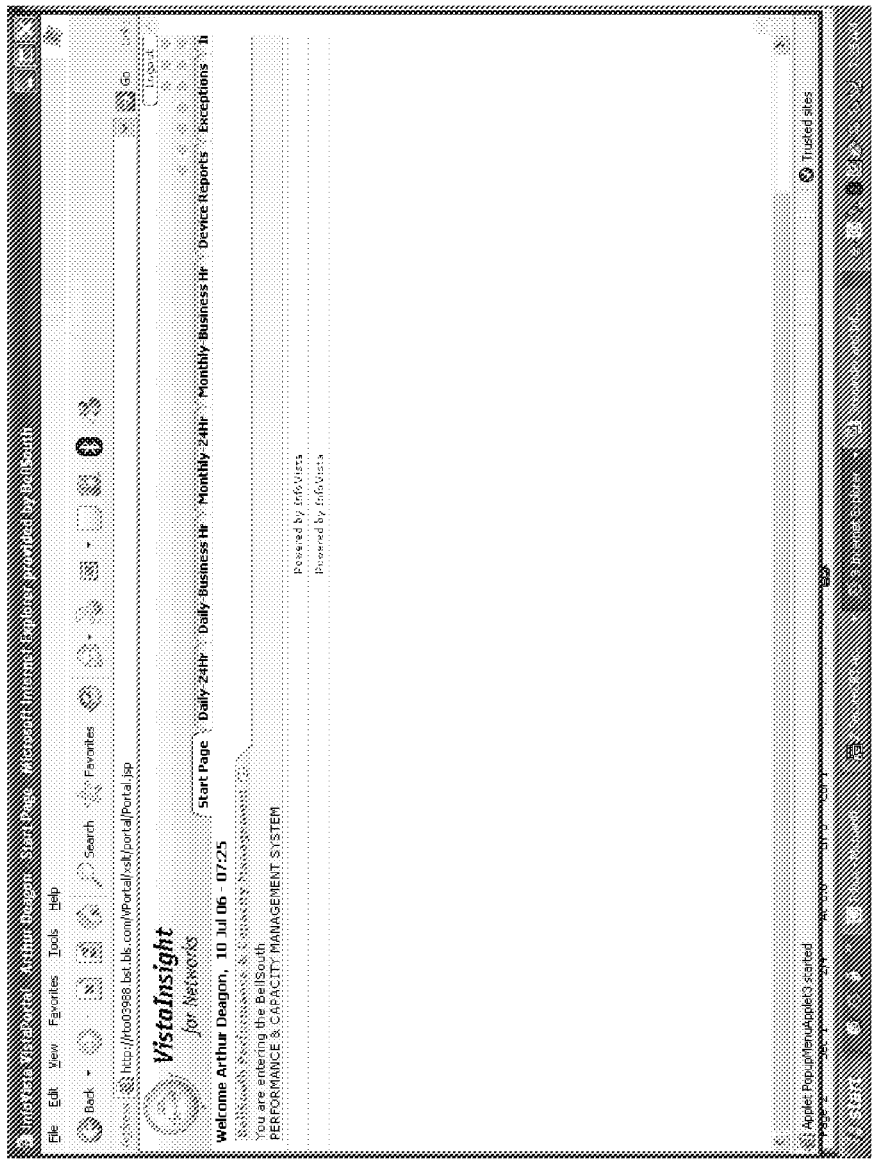
FIG. 4 is a screenshot of an InfoVista interface which is presented to a user after a user signs on using the single sign-on interface of FIG. 3.

In contrast, FIG. 3 shows a single sign-on interface the user receives when connecting to the InfoVista application 110 if SiteMinder single sign-on 125 is integrated with InfoVista 110, in one embodiment. And, FIG. 4 is the screen or interface a user receives after he/she signs on with single sign-on 125 or a user signs on using the SiteMinder application authentication. In one embodiment, SiteMinder single sign-on tool 125 helps eliminate multiple password issues and dangerous password practices while simplifying the end-user experience and enhancing security via identity-based access technology. This solution provides flexible authentication, directory independence, session management, kiosk support, password management and attribute-based entitlements—helping operational costs to be reduced, employee productivity to be improved, and regulatory compliance to be achieved.

Within one embodiment of the SiteMinder framework, represented in FIG. 1, the SiteMinder application 120 comprises two primary components, the SiteMinder policy server 127, and the SiteMinder agents 122. The SiteMinder policy server 127 provides policy management, authentication, authorization, and accounting services to web-based applications.

SiteMinder application 120 is a leading directory-enabled access management system for building and managing secure e-business sites.

A SiteMinder web agent 122 intercepts requests to protected resources and determines whether or not the resource is protected by the SiteMinder policy server 127. User identities are managed in an enterprise-wide logical repository. User information is actually stored in several user directories using a mix of technologies like RDBMS (Relational Database Management System) and LDAP (Lightweight Directory Access Protocol). Any access to protected resources is secured using centralized access policies based on user identities and roles. These policies are defined in the SiteMinder policy server 127. For instance, an access policy may state that users must have certain roles in order to be authorized to access an application.

Enterprise applications with different user interfaces are often existent in an enterprise network 102. Although the content of these applications conform to a set of specifications, the user interfaces are unique to each other. Providing a common user interface to different applications that results in a seamless presentation of the content in its uses, activities, and interactions is an aspect of SSO implementation.

Enterprise applications, such as InfoVista 110, are interfaced with the SiteMinder single sign-on tool 125 through SiteMinder agents 122 by exchanging user information. The agent 122 authenticates this user information against a SiteMinder policy. Once the authentication is done, access to all the applications in the domain may be established. If a corporation has implemented the SiteMinder application 120 to protect company web resources, authentication can be configured to require only that users authenticate through the SiteMinder application 120, after which they will not be required to present credentials again when logging in to other applications.

The SiteMinder policy server 127 has knowledge of both user identities and applications. It interfaces with the enterprise's multiple user directories. Information about a single user may be contained in several user stores that need to be queried to extract relevant user data. As previously mentioned, security enforcement is provided by agents 122 that intercept requests to any protected resource. Users can be authenticated against a specific user store 130 and authorized against another user store configured with the policy server 127, thus leveraging existing user information wherever it is available across the architecture. Web service containers host web services on industry specific platforms such as J2EE (Java 2 Platform, Enterprise Edition) technology.

The policy server 127 manages and enforces access control policies that define the operations that are allowed for each protected resource. SiteMinder application 120 can protect URL's (uniform resource locators) via its web-agents, J2EE resources via its application server agents or any string resource via its API (application program interface). In addition, rules may be constrained by time, to prevent access outside specified periods, or by specific IP addresses. The SiteMinder application 120 supports a variety of authentication schemes including basic username/password authentication, HTML forms-based authentication, certificate-based authentication, token based authentication, NTLM (NT Lan Manager), and/or combinations of them, as well as custom authentication schemes.

In addition to web agents 122, SiteMinder agents include affiliate agents (not shown) and application server agents (not shown). Where a web agent 122 is integrated with a standard web server 104 and enables the SiteMinder application 120 to manage access to a web site and its content according to pre-defined security policies, an affiliate agent runs on the web server of an affiliate (such as a business partner), and provides single sign-on and personalized content for users of the affiliate site—creating a seamless experience for the user. An application server agent is integrated with a J2EE application server to secure Java 2 Enterprise Edition (J2EE) resources.

Agents are the enforcement mechanisms for policy-based authentication and access control. By placing an agent 122 in a web server 104 that is hosting protected web content or applications, for example, administrators can coordinate security across a heterogeneous environment of systems and create a single sign-on environment for all users. For web servers 104, the web agent 122 integrates through each web server's extension API. It intercepts all requests for resources (URLs) and determines whether each resource is protected by the SiteMinder application 120. If the resource is not SiteMinder-protected, the request is passed through to the web server 104 for regular processing. If it is SiteMinder-protected, the web agent 122 interacts with the policy server 127 to authenticate the user and to determine if access to the specific resource is allowed. Depending on the policy setup, the web agent 122 may optionally also pass to the application (e.g., InfoVista application 110) a "response" that consists of the user's entitlements information, that allows the application to personalize the page content according to the needs and entitlements of each user. The web agent 122 caches extensive amounts of contextual information about the current user's access. The caching parameters that control these services are fully tunable by the administrator to optimize performance and security.

In one SiteMinder scenario, users attempt to access a resource at a specific URL via a browser 140 on a client 108. The SiteMinder web agent 122 protects that URL and passes incoming requests for authentication and authorization onto the policy server 127. The policy server 127 completes the authentication process (via LDAP or RDBMS lookup) and can apply authorization rules based on administrator-defined security policies in the policy server 127.

With regard to InfoVista 110 and SiteMinder 120, the present disclosure provides solutions for the configuration and customization of the two products to work together so that the InfoVista 110 and SiteMinder 120 applications work as if they are one application to the customer.

Without integration, InfoVista's authentication method does not provide the benefits for SiteMinder like enforcement of password rules and reduction of operational costs. In order to use InfoVista authentication, a variance may have to be completed and approved by a corporation's management stating they would take the risk associated with the InfoVista authentication method. With SiteMinder, the corporation's customers authenticate through the SiteMinder single sign-on screen they are accustomed to with their corporate user-ID and password they use for every other application on the corporate network using the SiteMinder application 120. This also eliminates the need for application support to administer and reset passwords.

Accordingly, configuration procedures for integration of SiteMinder 120 and InfoVista 110 are presented, for one embodiment. The SiteMinder application 120 is installed on the corporation's network 102 following SiteMinder's documentation and instructions. In one implementation, among others, "Installing the SiteMinder V5 Agent" guide is followed. As documented in the installation guide, a host 109 of the SiteMinder application 120 is registered with the SiteMinder application 120.

Since InfoVista application 110 may use a release of Apache software 112, distributed by IBM corporation of Armonk, N.Y., that is older than the documented supported version, some manual configuration is implemented, in one embodiment. The httpd.conf file in the "Apachehome"/conf directory has additional "LoadModule" statements added above the existing "LoadModule" statements. Here is a sample of the additional statements:

LoadModule sm_module/opt/InfoVista/SiteMinder/webagent/lib/libmod_sm20.so
LoadModule sm_module/opt/InfoVista/SiteMinder/webagent/lib/mod_sm.so
SmInitFile/opt/InfoVista/apache2.0/conf/WebAgent.conf The /apache/bin/envvars file is also updated with the information documented in the "Installing and Configuring the Framework Agent for Apache 2.0" guide, in one implementation, among others.

Figure 5:
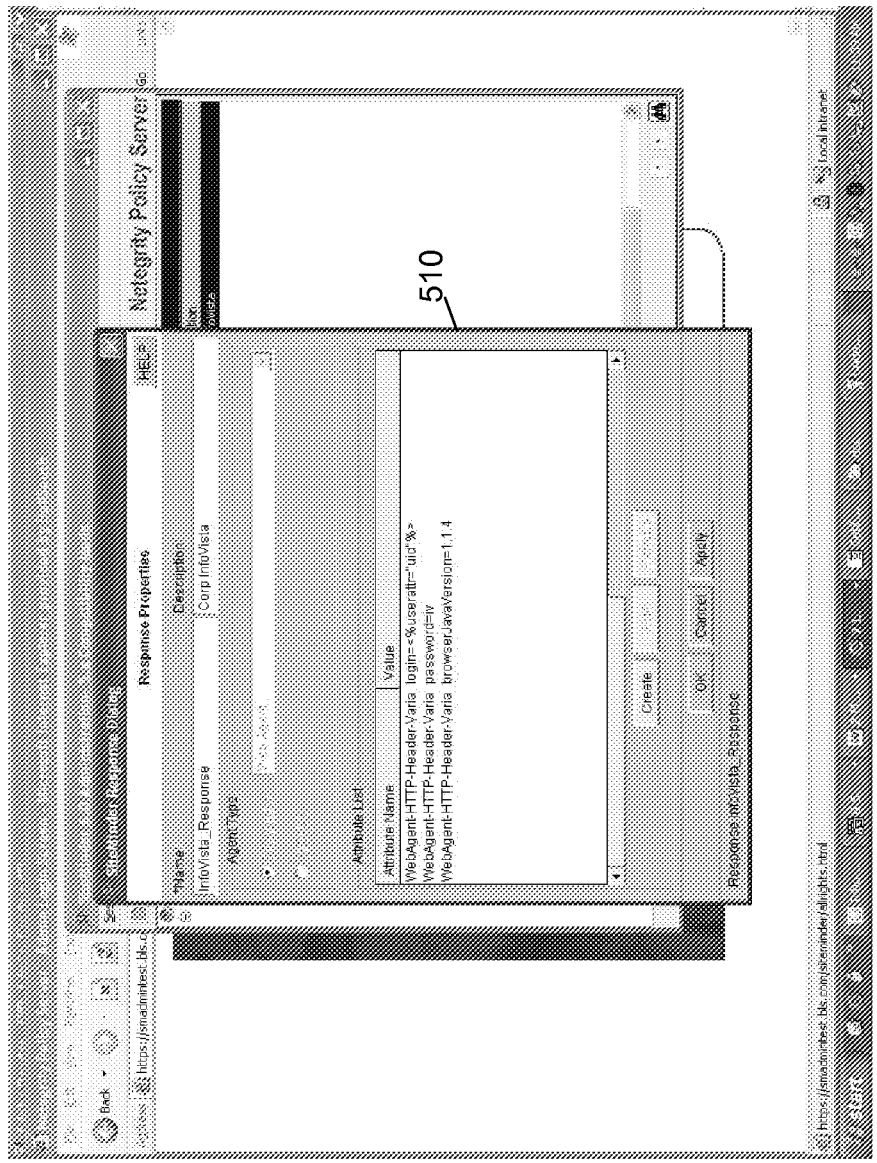
FIG. 5 is a screenshot of an exemplary interface to the SiteMinder application of FIG. 1 showing a page used to configure settings and parameters of the SiteMinder application.

The security.properties InfoVista file is edited to accept the correct login strings for SiteMinder 120. FIG. 5 is an example of the SiteMinder response page 510 that is set up to match the $VistaPortalHome/site/WEB-INF/properties/security.properties file which is shown in FIG. 6.

In the present example, the normal web address for access to InfoVista application 110 is "http://host/VPortal" in one embodiment. When the application is configured to work with SiteMinder application 120, the web address that is used is "http://host/VPortal/Connect.jsp".

The user is added to the InfoVista application 110 as a user with the correct ID (identification) and password that is to be passed to the InfoVista application 110 from the SiteMinder application 120. To find proper customization, some trial and error may be involved. Authentication information in the properties file for InfoVista application 110 is modified to match the information being sent from the SiteMinder application 120. With the SiteMinder application 120, it is also customized and configured to pass the types of information needed by the InfoVista application 110. In one embodiment, the InfoVista application 110 looks for an HTTP (hypertext transfer protocol) header credential. In that header, a login name and a password are sent that is needed to access the InfoVista application 110. At this point, the user should be able to log into InfoVista 110 through SiteMinder 120 and be provided the appropriate web page.

In one embodiment, the InfoVista application 110 is set up to limit users to view certain reports for network devices based on the ID used to enter the application. Users can be placed in groups so that a certain group of users can use certain reports based on their ID that is used to log into the application 110.

SiteMinder 120 allows users to log in through its single sign-on tool 125 and passes the credentials for the InfoVista application 110 in the policy server 127 to the InfoVista application 110 along with the proper URL address. The InfoVista application 110 can access the credentials through the HTTP header, and use the credentials for the application because the user has already been authenticated through the SiteMinder single sign-on process.

In one embodiment, the InfoVista application 110 has its own log in process but it is being superseded with the SiteMinder SSO process. The InfoVista authentication procedure may not have password measures to require passwords to be periodically changed ("an aging process") as desired by a corporation's security policy. Accordingly, with the proper customization of both tools in order to interoperate together and talk to each other in a proper way to work, integration of the SiteMinder 120 and InfoVista 110 applications is possible.

Figure 7:
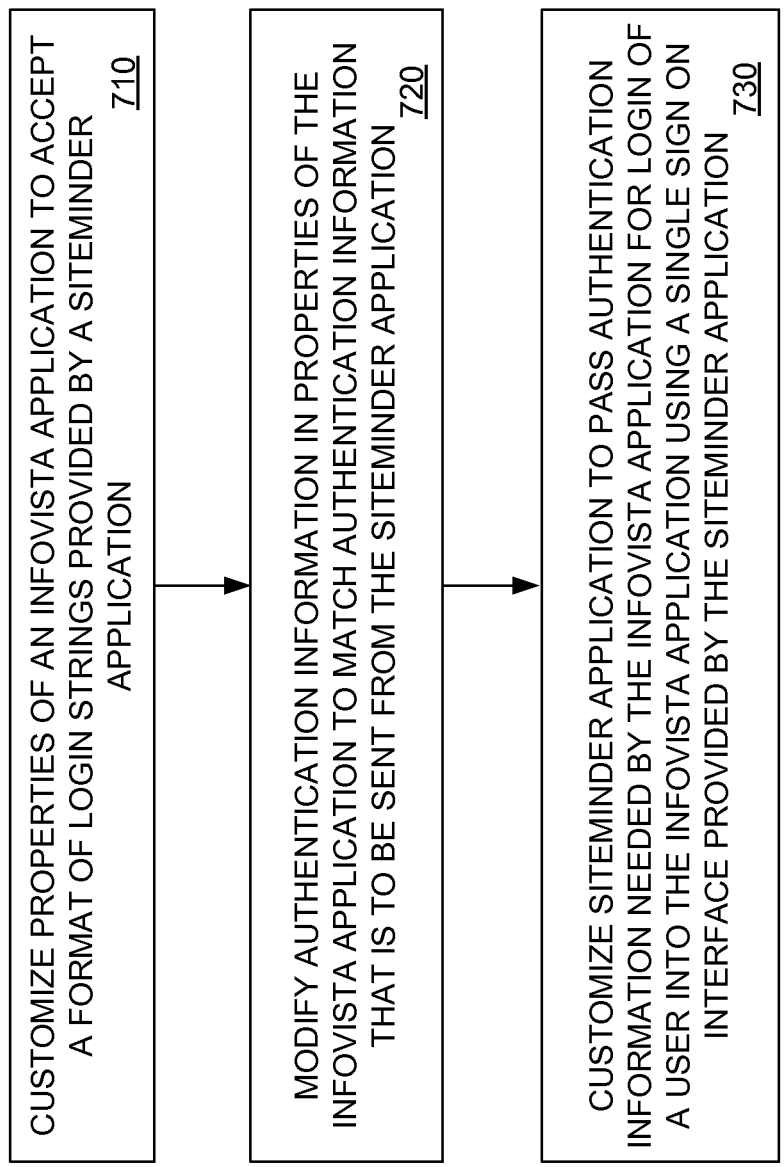
FIG. 7 is a flowchart diagram of one embodiment, among others, of a method of integrating software applications in accordance with the present disclosure.

Referring now to FIG. 7, a flowchart showing an embodiment, among others, of a method of integrating software applications is presented.

One embodiment of the method includes customizing (710) properties of an InfoVista application 110 to accept format of login strings provided by a SiteMinder application 120 and modifying (720) authentication information in properties of InfoVista application 110 to match authentication information that is to be sent from the SiteMinder application 120. The method further includes customizing (730) the SiteMinder application 120 to pass authentication information needed by the InfoVista application 110 for login of a user into the InfoVista application 110 using a single sign-on interface provided by the SiteMinder application 120.

In some embodiments, the SiteMinder application 120 passes authentication information to the InfoVista application 110 via a header in an HTTP request. Also, in some embodiments, if a current version of an HTTP server 104 is not supported by the InfoVista application 110, the method further comprises prompting a user to manually configure parameters of the InfoVista application 110 to support the current version of the HTTP server 104. Additionally, some embodiments allow for particular versions of applications employed in the network infrastructure 102 to be customized or configured, such as InfoVista VistaInsight for Networks version 1.2 or earlier, SiteMinder version 5 or earlier, Apache® version 2.0 or earlier, etc. In some embodiments, a software module or script having computer-executable instructions for performing one or more embodiments of the aforementioned method(s) (or similar constructs) may be executed by a client 108 or server 104, 106, 109. For illustration purposes, modules 160, 180 on servers 109, 106 may have instructions for performing one or more of the aforementioned steps.

Components of the present disclosure comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the present disclosure includes embodying the functionality of embodiments of the present disclosure in logic embodied in hardware or software-configured mediums and components implementing such logic.

Figure 8:
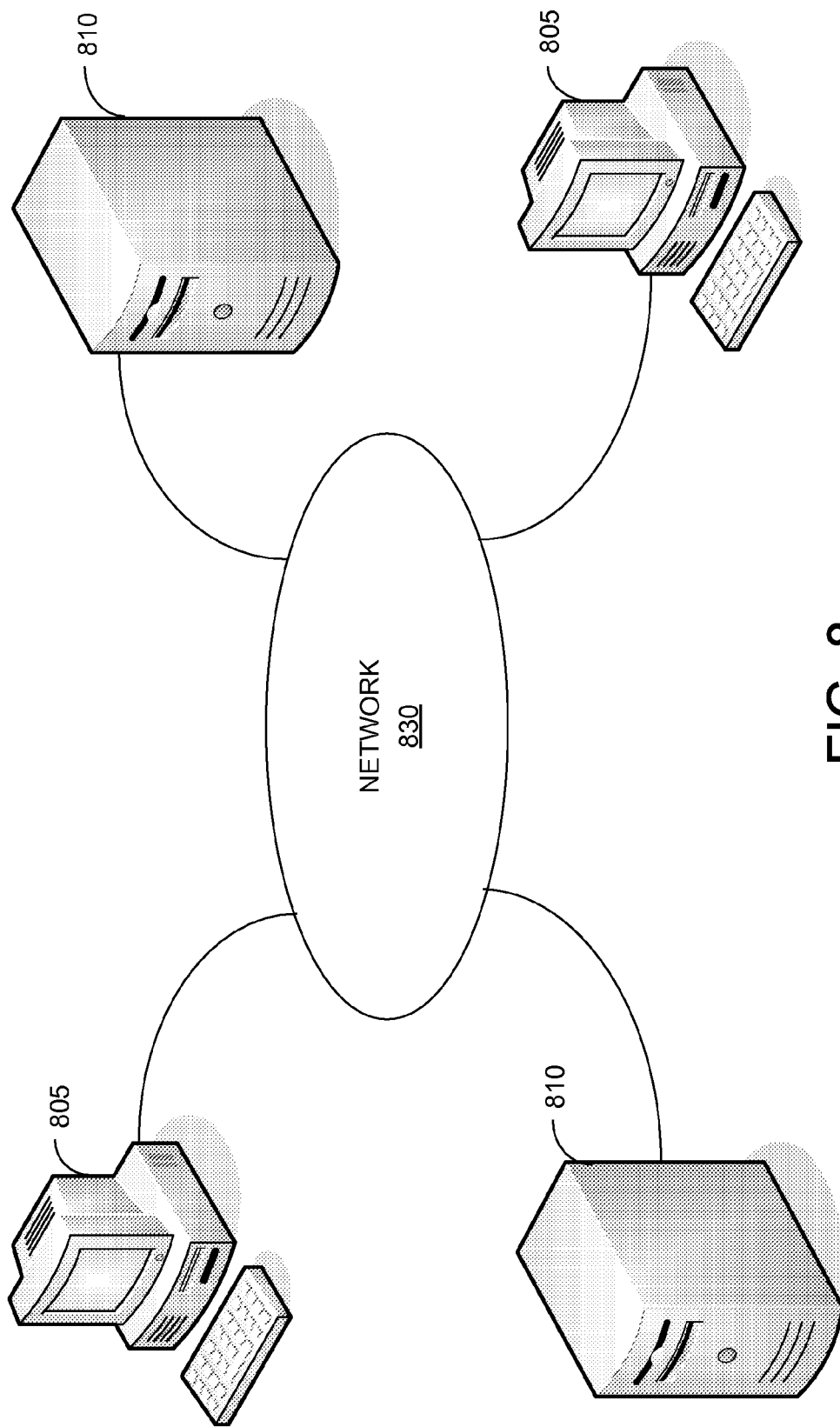
FIG. 8 is a block diagram of one embodiment, among others, of a client-server environment, such as the World Wide Web (the Web), in which the network infrastructure of FIG. 1 may be facilitated.

FIG. 8 shows one embodiment, among others, of a client-server environment, such as the World Wide Web (the Web or web), in which the network infrastructure may be facilitated. The architecture of the Web follows a client-server model. The terms "client" and "server" are used to refer to a computer's general role as a requester of data (the client) or provider of data (the server). Web clients 805 and Web or HTTP servers 810 communicate using a protocol such as HyperText Transfer Protocol (HTTP). In the Web environment, Web browsers reside on clients and render Web documents (pages) served by the Web servers. The client-server model is used to communicate information between clients 805 and servers 810. Web servers 810 are coupled to the network 830 (e.g., Internet) and respond to document requests and/or other queries from Web clients 805. When a user selects a document by submitting its Uniform Resource Locator (URL), a Web browser, such as Mozilla Firefox®, Netscape Navigator®, or Internet Explorer®, opens a connection to a server 810 and initiates a request (e.g., an HTTP get) for the document. The server 810 delivers the requested document, typically in the form of a text document coded in a standard markup language such as HyperText Markup Language (HTML).

Figure 9:
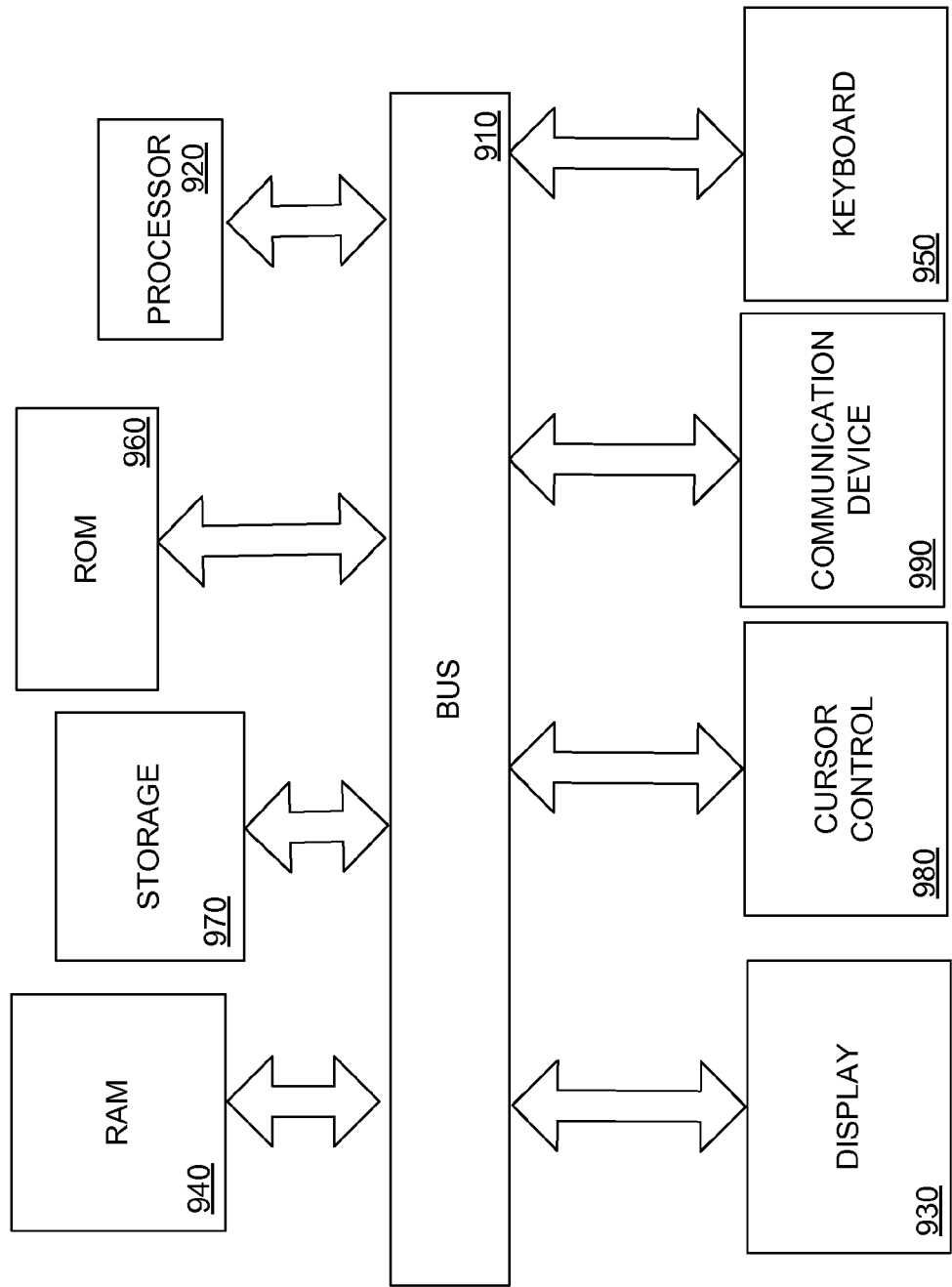
FIG. 9 is a block diagram of a computer system representing an exemplary server which may be utilized in the infrastructure of FIG. 1.

Accordingly, FIG. 9 is a computer system 900 representing an exemplary server which may be utilized in the system of FIG. 9. Computer system 900 comprises a bus or other communication means 910 for communicating information, and a processing means such as processor 920 coupled with bus 910 for processing information. Computer system 900 further comprises a random access memory (RAM) or other dynamic storage device 940 (referred to as main memory), coupled to bus 910 for storing information and instructions to be executed by processor 920. Main memory 940 also may be used for storing temporary variables or other intermediate information during execution of instructions by processor 920. Computer system 900 also comprises a read only memory (ROM) and/or other static storage device 960 coupled to bus 910 for storing static information and instructions for processor 920.

A data storage device 970 such as a magnetic disk or optical disc and its corresponding drive may also be coupled to computer system 900 for storing information and instructions. Computer system 900 can also be coupled via bus 910 to a display device 930, such as a cathode ray tube (CRT) or liquid crystal display (LCD), for displaying information to a computer user. Typically, an alphanumeric input device 950 (e.g., a keyboard), including alphanumeric and other keys, may be coupled to bus 910 for communicating information and/or command selections to processor 920. Another type of user input device is cursor control 980, such as a mouse, a trackball, or cursor direction keys for communicating direction information and command selections to processor 920 and for controlling cursor movement on display 930.

A communication device 990 is also coupled to bus 910 for accessing remote servers via a network, such as the Internet, for example. The communication device 990 may include a modem, a network interface card, or other commercially available network interface devices, such as those used for coupling to an Ethernet, token ring, or other type of network. In any event, in this manner, the computer system 900 may be coupled to a number of clients and/or other servers via a conventional network infrastructure, such as a company's Intranet and/or the Internet, for example.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

Further, teachings of the present disclosure may be extended to other software applications having similar integration problems.

Therefore, having thus described the invention, at least the following is claimed:

1. A method comprising:
    editing a properties file of a first application to accept a login string provided by a second application, wherein the first application collects and provides performance information on network devices and the second application manages authorization permissions, wherein the authorization permissions comprise a time constraint to prevent access to a resource outside of a specified period and an IP address restriction to prevent access to the resource by a specific IP address;
    modifying first authentication information in the properties file of the first application to match second authentication information provided by the second application;
    configuring the second application so that the second authentication information provided by the second application is accepted by the first application for login of a user into the first application using a single sign-on interface provided by the second application, wherein the login of the user into the first application only requires authentication through the second application using the second authentication information in the single sign-on interface and a process of logging into the first application is superseded by login of the user using the single sign-on interface provided by the second application;
    determining whether the resource is protected by the second application; and
    in response to determining that the resource is protected by the second application, authenticating the user to determine if access to the resource is allowed based on the authorization permissions.

2. The method of claim 1, wherein the second authentication information is passed to the first application from the second application via a header in a hypertext transfer protocol request.

3. The method of claim 1, further comprising prompting the user to manually configure parameters of the first application to support a current version of a hypertext transfer protocol server if the current version of the hypertext transfer protocol server is not supported by the first application.

4. A non-transitory computer readable medium storing instructions that, when executed by a computer comprising a processor, cause the processor to perform operations comprising:
    editing a properties file of a first application to accept a login string provided by a second application, wherein the first application collects and provides performance information on network devices and the second application manages authorization permissions, wherein the authorization permissions comprise a time constraint to prevent access to a resource outside of a specified time period and an IP address restriction to prevent access to the resource by a specific IP address;
    modifying first authentication information in the properties file of the first application to match second authentication information provided by the second application;
    configuring the second application so that the second authentication information provided by the second application is accepted by the first application for login of a user into the first application using a single sign-on interface provided by the second application, wherein the login of the user into the first application only requires authentication through the second application using the second authentication information in the single sign-on interface and a process of logging into the first application is superseded by login of the user using the single sign-on interface provide by the second application;
    determining whether the resource is protected by the second application; and
    in response to determining that the resource is protected by the second application, authenticating the user to determine if access to the resource is allowed based on the authorization permissions.

5. The non-transitory computer readable medium of claim 4, wherein the second authentication information is passed to the first application from the second application via a header in a hypertext transfer protocol request.

6. The non-transitory computer readable medium of claim 4, wherein the operations further comprise prompting the user to manually configure parameters of the first application to support a current version of a hypertext transfer protocol server if the current version of the hypertext transfer protocol server is not supported by the first application.

7. A system comprising:
    a processor; and
    a memory storing instructions, that when executed by the processor, cause the processor to perform operations comprising:
    editing a properties file of a first application to accept a login string provided by a second application, wherein the first application collects and provides performance information on network devices and the second application manages authorization permissions, wherein the authorization permissions comprise a time constraint to prevent access to a resource outside of a specified period and an IP address restriction to prevent access to the resource by a specific IP address,
    modifying first authentication information in the properties file of the first application to match second authentication information provided by the second application,
    configuring the second application so that the second authentication information provided by the second application is accepted by the first application for login of a user into the first application using a single sign-on interface provided by the second application, wherein the login of the user into the first application only requires authentication through the second application using the second authentication information in the single sign-on interface and a process of logging into the first application is superseded by login of the user using the single sign-on interface provided by the second application,
    determining whether the resource is protected by the second application, and in response to determining that the resource is protected by the second application, authenticating the user to determine if access to the resource is allowed based on the authorization permissions.

8. The system of claim 7, wherein the second authentication information is passed to the first application from the second application via a header in a hypertext transfer protocol request, and wherein the system further comprises a server hosting the first application.

9. The system of claim 7, further comprising a hypertext transfer protocol server, wherein the operations further comprise prompting the user to manually configure parameter of the first application to support a current version of a hypertext transfer protocol server if the current version of the hypertext transfer protocol server is not supported by the first application.

10. The system of claim 7, wherein the second application comprises a suite of components designed to work together and capable of being installed on separate servers.

11. The system of claim 7, wherein the operations further comprise prompting the user to manually configure parameters of the first application to support a current version of a hypertext transfer protocol server.

12. The method of claim 1, further comprises:
querying a plurality of user stores; and
extracting relevant user data from the plurality of user stores, the relevant user data comprising the authorization permissions.

13. The method of claim 1, further comprising:
intercepting a request for the resource;
authenticating the user against a first user store; and
authorizing the request for the resource against a second user store.

14. The method of claim 1, wherein the resource comprises company web resources.

15. The method of claim 1, wherein the resource comprises at least one of:
java server page files, active server page files, or hypertext markup language files.

* * * * *